(12) United States Patent
Ciprian

(10) Patent No.: US 8,544,794 B2
(45) Date of Patent: Oct. 1, 2013

(54) FLOOR PANEL AND INSTALLATION FOR FIXING LAYOUT ELEMENTS COMPRISING SUCH PANELS

(75) Inventor: Danilo Ciprian, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 818 days.

(21) Appl. No.: 12/088,335

(22) PCT Filed: Sep. 25, 2006

(86) PCT No.: PCT/EP2006/066711
§ 371 (c)(1),
(2), (4) Date: Mar. 27, 2008

(87) PCT Pub. No.: WO2007/036508
PCT Pub. Date: Apr. 5, 2007

(65) Prior Publication Data
US 2009/0026804 A1    Jan. 29, 2009

(30) Foreign Application Priority Data
Sep. 28, 2005 (FR) ...................................... 05 52918

(51) Int. Cl.
*B64D 11/00* (2006.01)
*B64D 13/00* (2006.01)

(52) U.S. Cl.
USPC ........................................................ 244/118.5

(58) Field of Classification Search
USPC ............... 244/118.5, 118.2, 119, 131, 134 A, 244/117 R, 118.6
See application file for complete search history.

(56) References Cited

U.S. PATENT DOCUMENTS

| | | | | |
|---|---|---|---|---|
| 2,607,447 | A * | 8/1952 | Tuttle | 52/787.12 |
| 2,934,372 | A * | 4/1960 | Jewell et al. | 296/186.1 |
| 4,399,642 | A | 8/1983 | Bard et al. | |
| 4,878,795 | A * | 11/1989 | Woodrow et al. | 411/501 |
| 5,992,112 | A * | 11/1999 | Josey | 52/309.8 |
| 6,219,983 | B1 | 4/2001 | Graakjaar Jensen et al. | |
| 7,182,291 | B2 * | 2/2007 | Westre et al. | 244/119 |
| 7,350,853 | B2 * | 4/2008 | Fitze | 296/193.07 |
| 7,669,384 | B2 * | 3/2010 | Kaida et al. | 52/790.1 |

* cited by examiner

*Primary Examiner* — Tien Dinh
*Assistant Examiner* — Valentina Xavier
(74) *Attorney, Agent, or Firm* — Dickinson Wright PLLC

(57) ABSTRACT

The disclosed embodiments concern a floor panel for a transport vehicle such as an aircraft and an installation for fixing cabin layout elements including such panels. The disclosed embodiments are wherein the floor panel includes at least one mounting rail having a lengthwise axis, inserted into the layer of the aforementioned panel.

9 Claims, 3 Drawing Sheets

State of the prior art

FLOOR PANEL AND INSTALLATION FOR FIXING LAYOUT ELEMENTS COMPRISING SUCH PANELS

CROSS-REFERENCE TO RELATED APPLICATIONS

This application is the National Stage of International Application No. PCT/EP2006/066711, International Filing Date, 2006-09-25, which designated the United States of America, and which international application was published under PCT Article 21(2) as WO Publication No. WO 2007/036508 A1 and which claims priority from French Application No. 0552918, filed 2005-09-28, the disclosures of each being incorporated by reference in their entirety.

BACKGROUND

1. Field

The disclosed embodiments concern a floor panel for a transport vehicle such as an aircraft and an installation for fixing cabin layout elements comprising such panels. Specifically, the disclosed embodiments refer to an installation for fixing cabin layout elements (seats, galley, . . . ) of an aircraft.

These types of installations are well known in passenger transport aircraft, for example, which include at least two rails of assembled seats spaced one after another and extending longitudinally in a forward/aft direction on the airplane. Each frame has one, two, or several seats which form a span of seats, being able to be fixed upon these mounting rails. Other cabin layout elements such as the galleys, toilets, . . . are fixed on these same rails or over appropriate structural elements if necessary.

FIG. 1 shows a schematic partial cross-cut view of a cabin floor of the prior art with an assembly seat rail (1). Each rail (1) includes a lower rail element which generally has the shape of an I, which is constituted by a lower bar (2), a vertical core (3) and an upper bar (4). Extending upwards starting from this upper bar (4) is found an element of the upper rail which has a section (5) in the shape of C, so as to form a slide intended for fixing the elements of installation and of seats in particular. The upper bar (4) also includes flat side flanges (6, 7) upon which the floor panels (8) are mounted.

2. Brief Description of Related Developments

The conventional coating on the floor of the cabin consists of floor panels (8) made of a composite sandwich (honeycomb structure). These floor panels (8) which are of a low thickness, typically on the order of 10 mm, are fixed using bolts on the side flanges (6, 7) of the mounting rails of the seats. When the commercial cover is installed, a floor covering, for example a fitted carpet is installed. This floor covering serves to protect the floor panels from the abuse linked to shifting or any other abuse due to occupancy of the transport vehicle cabin.

The mounting rails for seats show satisfactory mechanical characteristics for holding up under the stress to which the layout elements are subject, and of the seats in particular. However, these mechanical characteristics alone are not sufficient because, as shown in the FIG. 1, the mounting rail (1) is particularly exposed to corrosion on an aircraft. The airplane cabin floor is, in effect, subjected to the influence of various corrosive elements such as such as spilt liquids, moisture condensation or others. A rapid deterioration of the mechanical characteristics of the rails may be observed. Therefore, frequent repairs and replacement by qualified operators are necessary on airplanes in service.

Furthermore, the installations for fixing of seats fulfill the interior installation layout of a standardized plane.

It would nevertheless be essential to have an installation for fixing seats that offers greater flexibility in the airplane's interior installation in order to comply with the operational and comfort criteria specific to certain airline companies.

The ability to vary the interior installation more easily could also prove to be interesting, for example, for flights where there are fewer passengers on board. Moreover, larger spaces between the rows of seats or between the seats could thus be arranged to offer greater comfort to the passengers without having to resort to the installation of additional structures. Alternatively, a space for cargo could be created according to the needs of the company without modifying the primary structure.

SUMMARY

It would be advantageous to provide a floor panel for vehicle used for the transportation of passengers such as an aircraft, which is simple in its design and its operational, financial, and economic manner, having a very high mechanical strength, a high resistance to corrosion while having a minimal mass. In one aspect the disclosed embodiments provide an installation for fixing the layout elements which allows great flexibility in the interior layout of a vehicle used for transporting passengers.

For this purpose, the disclosed embodiments refer to a floor panel for vehicles used for transporting passengers, such as an aircraft.

According to the disclosed embodiments, this panel includes at least one mounting rail having a lengthwise axis, inserted into the layer of said panel.

In various specific embodiments of this floor panel, each has its own specific and particular advantages for numerous possibilities in technical combinations:

it includes a higher surface with an elongated opening placed along the lengthwise axis of the mounting rail to allow the installation of fixture elements and of seats in particular, on the aforementioned rail.

It should be noted that the definition of the geometrical interface with all the fixture elements is unchanged when compared to the principle of the prior art.

The panel is structured as a sandwich around a core with at least two walls placed on the opposite outside surfaces of a honeycomb core respectively. These walls are composite reinforcements. The mounting rail has a section which is I-shaped and is inserted into the honeycomb core.

Advantageously, this mounting rail is made of a material which fulfills the criteria for mechanical durability and resistance to corrosion required for applications in the aeronautical field. For example, it may be made of titanium or an aluminum alloy.

The disclosed embodiments also relate to an installation for fixing a set of interior fixtures and seats, in particular, in a vehicle for transporting passengers comprising only one set of parallel cross beams.

According to the disclosed embodiments, this installation includes the floor panels as described above, which are assembled upon the cross beams using bolts as a means of fixation.

Finally, the disclosed embodiments concern aircraft including said installation for fixing layout elements.

BRIEF DESCRIPTION OF THE DRAWINGS

The disclosed embodiments will be described more in detail in reference to the annexed drawings, in which.

DETAILED DESCRIPTION

Figure 1:
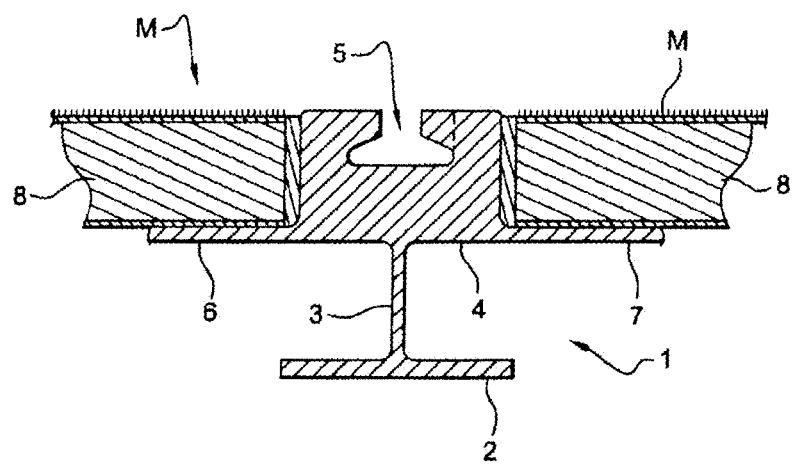
FIG. 1 shows a schematic partial cross-cut view of a cabin floor of the prior art.
Figure 2A:
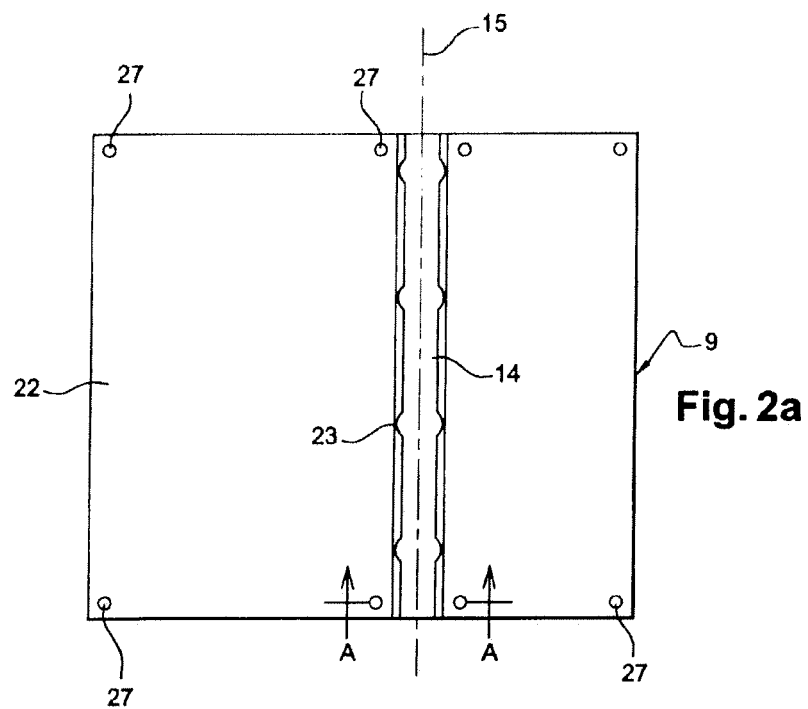
FIG. 2 is a schematic view of a floor panel for a passenger transport vehicle according to one embodiment of the disclosed embodiments, the floor panel is shown in an overhead view (FIG. 2a) and in a cross view along the axis (A-A) of the floor panel (FIG. 2b)
Figure 2B:
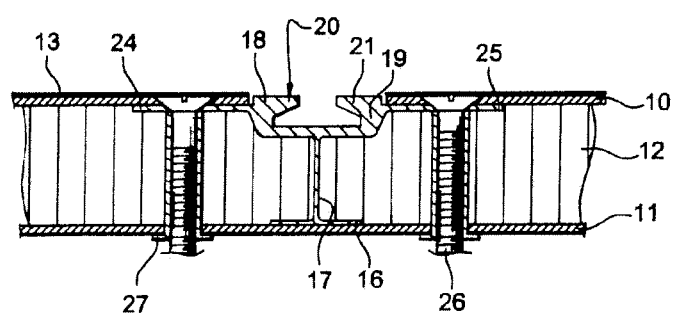

FIG. 2 shows a floor panel for vehicles used for transporting passengers according to one embodiment of the disclosed embodiments. The floor panel (9) is structured as a sandwich around a core comprising at least two walls (10, 11) placed respectively on the opposite external surfaces of a honeycomb core (12).

These walls (10, 11) are composite frames. The composites may be chosen from the carbon, graphite, glass, silicon, silicon carbide composite groups, or any other composite which has the necessary rigidity while responding to the low mass restriction related to the aeronautical field (these composite groups are given as a non-restrictive example).

The honeycomb core (12) is, for example, built of aramid fiber. Indeed, aramid fibers present low inflammability, high break resistance and a high elasticity modulus.

As in the state of the art, a floor covering (13), for example a fitted carpet may be installed over the floor panel (9). This covering (13) then serves to protect the floor panels. The floor panel (9) comprises one mounting rail (14) for seats having a lengthwise axis (15), inserted in the layer of said panel (9). The same panel (9) may, however, contain two or more rails (14) placed at various positions to allow the layout of fixtures as required by the user's needs.

The mounting rail (14) includes a lower section of railing in a reversed T-shape and includes a lower bar (16) and a vertical core (17). It also includes an upper section of railing including a pair of flanges (18, 19). These flanges are spaced laterally along the lengthwise axis (15) of the mounting rail, each having a lip (20, 21). These lips (20, 21) are oriented towards each other to form a slide placed along the lengthwise axis (15) of the mounting rail. This slide is to be used for fixing layout elements and chair rails, specifically.

However, the mounting rail (14) is not limited to this embodiment which has been given only as an illustration and may include, for example, a lower section of railing (16, 17) with a section in the shape of a Q.

The upper surface (22) of the floor panel has an elongated opening placed along the lengthwise axis (15) of the mounting rail to allow fixing of layout elements.

In this particular embodiment, the rail (14) is inserted into the floor panel (9) in front of the framework of the ensemble comprised of the core (12) and at least two walls (10, 11). For this embodiment, a recessed area ready to receive at least the lower section of the rail is created within the core layer (12), the mounting rail is then recovered on at least one portion of its external surface with a non-polymerized adhesive film. The lower section of the rail is positioned in the recessed area and it is polymerized in order to interlock the rail with the sandwiched core structure. The recessed area has a shape that is appropriate for receiving the part of the mounting fail (14) destined to be inserted into the floor panel layer (9).

The upper rail section also includes two side flanges (24, 25) each of which has at least one opening to be used for the insertion of a means of fixing (26) the panel on a cross-member. The means of fixing (26) is, for example, a steel or titanium bolt.

However, fixing of the floor panel (9) can pose problems because the core (12) and the reinforcements (10, 11) have insufficient mechanical properties to support a concentrated force on any one point of the sandwich structure such as that caused by a bolt. Therefore, the panel (9) includes inserts (27) in order to interface between the means of fixing (26) and the sandwich structure and to distribute in this way the connecting force over a larger area of the sandwich structure.

Each of the inserts (27) includes a cylindrical cross body for the passage of the bolt type means of fixing (26). Moreover, it includes a flange or broad head which rests against the lower external surface of the floor panel (9) in order to distribute the force over a greater area of the lower surface of the panel. An adhesive layer is advantageously placed between the flange and the external surface of the lower wall of the floor panel (9) in such a way as to assure that the sandwich structure is watertight.

The insert (27) is assembled on the sandwich structure so that the principal axis of the cylindrical cross body is centered on the opening corresponding to the lateral flanges (24, 25). This insert (27) is metal and preferably made of an aluminum alloy, titanium, or even Invar.

Figure 3:
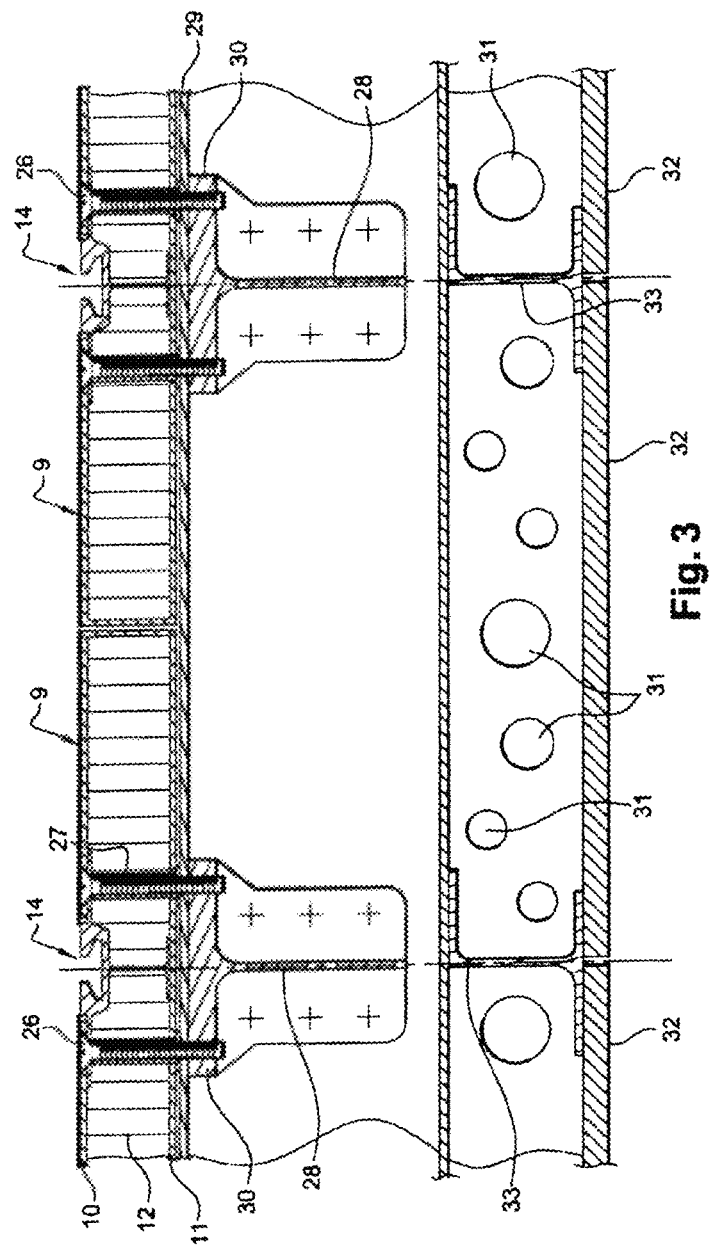
FIG. 3 shows schematically a partial crosscut view of an installation for fixing layout elements in an aircraft according to one embodiment of the disclosed embodiments.

FIG. 3 shows a partial crosscut view of an installation for fixing layout elements in one individual embodiment of the disclosed embodiments. This installation refers to the interior cabin layout of an aircraft.

This installation includes a set of cross beams (28) with a consistently parallel height and floor panels (9) such as those described above assembled on these cross beams (28) by the bolt type means of fixing (26). These means of fixing (26) are advantageously placed on each corner of the panel (FIG. 2A). Furthermore, in order to ensure greater rigidity of the mounting rail (14), the means of fixing (26) are preferably planned to be placed at the level of the lateral flanges (24, 25) of the fixing rail.

When a lengthwise joint of the two floor panels (9) is made over a cross beam (28), a watertight joint (29) is preferably placed between these panels and the upper bar (30) of that cross beam (28). When the lengthwise joint between two floor panels (9) is not located over a cross beam (28), a watertight joint (29) should be advantageously placed between these floor panels (9) and the upper bars of the two successive cross beams (28) (FIG. 3). This watertight joint (29) may be of metal, composite, or possibly rubber.

Each of these cross beams (28) are fixed to the fuselage of the aircraft. These cross beams (28) may be made of, for example, an organic composite material reinforced with carbon fibers (CFRP).

For the installation of the systems (cables, air conduits, . . . ) (31), a space is provided in the lower part of the aircraft, generally used as a luggage hold with or without using containers. Creating this space requires a separation between the floor structure that is obtained by the cover panels (32). These cover panels (32) are fixed over their sections (33) connected to the lower part of the cross beams (28). Thus, each of the cross beams (28) supports a set of sections (33) which allows the creation of this space through which the systems pass (31). These cover panels (32) form the ceiling of the cargo compartment. The systems (31) are placed between the cover panels (32) and the lower parts of the cross beams (28).

These sections (33) may be made of a lightweight alloy, such as for example of aluminum.

The invention claimed is:

1. Floor panel for a passenger transport vehicle, comprising:
   a sandwich structure of upper and lower walls placed on opposite external surfaces of a core;
   at least one mounting rail having a lengthwise axis, wherein the at least one mounting rail is comprised of:
      an upper section, with the upper section including lateral flanges placed along the lengthwise axis of the mounting rail and configured to form an elongated opening for installing fixture elements on the mounting rail, and
      a lower section, with the lower section including a lower bar and a vertical core, wherein the lower section of the mounting rail is positioned in a recessed area of the core of the sandwich structure;
   inserts inserted into said panel, wherein said inserts are configured to extend from a bottom side of said panel through the lower wall and core of the sandwich structure and up to a bottom of said lateral flanges of the mounting rail; and
   transverse means of fixing inserted through the inserts and into at least one opening of each lateral flange.

2. The panel according to claim 1, wherein said core is a honeycomb core, the walls comprise composite reinforcements and said mounting rail is inserted into the honeycomb core.

3. The panel according to claim 2, wherein each of said inserts includes a cylindrical cross body having a main axis centered over the corresponding lateral flange opening and is joined to the honeycomb core.

4. The panel according to claim 1, wherein said flanges are laterally spaced along said lengthwise axis and each include a lip, wherein said lips are oriented towards each other to form a slide placed along the lengthwise axis of said mounting rail.

5. An installation for fixing layout elements in a passenger transport vehicle comprising at least one panel assembled upon a cross beam of the passenger transport vehicle,
   wherein the at least one panel comprises:
      a sandwich structure of upper and lower walls placed on opposite external surfaces of a core;
      at least one mounting rail having a lengthwise axis, wherein the at least one mounting rail is comprised of:
         an upper section, with the upper section including lateral flanges placed along the lengthwise axis of the mounting rail and configured to form an elongated opening for installing fixture elements on the mounting rail, and
         a lower section, with the lower section including a lower bar and a vertical core, wherein the lower section of the mounting rail is positioned in a recessed area of the core of the sandwich structure;
      inserts inserted into said panel, wherein said inserts are configured to extend from a bottom side of said panel through the lower wall and core of the sandwich structure and up to a bottom of said lateral flanges of the mounting rail; and
      transverse means of fixing inserted through the inserts and into at least one opening of each lateral flange,
   wherein the at least one panel is fixed by the transverse means of fixing to the cross beam to form the installation.

6. The installation according to claim 5, further comprising a watertight joint at each union of two floor panels.

7. An aircraft including an installation for fixing layout elements, wherein said installation is an installation according to claim 5.

8. An aircraft including an installation for fixing layout elements, wherein said installation is an installation according to claim 6.

9. The installation according to claim 5, further comprising a set of parallel cross beams upon which the at least one floor panel is assembled, wherein each of said cross beams is connected to a set of sections of cover panels of a ceiling of a cargo compartment under said at least one floor panel which allows creation of a space through which systems of said transport vehicle pass.

* * * * *